(No Model.)
W. L. SPENCER.
RUNNER FOR SEED PLANTERS.
No. 604,800. Patented May 31, 1898.
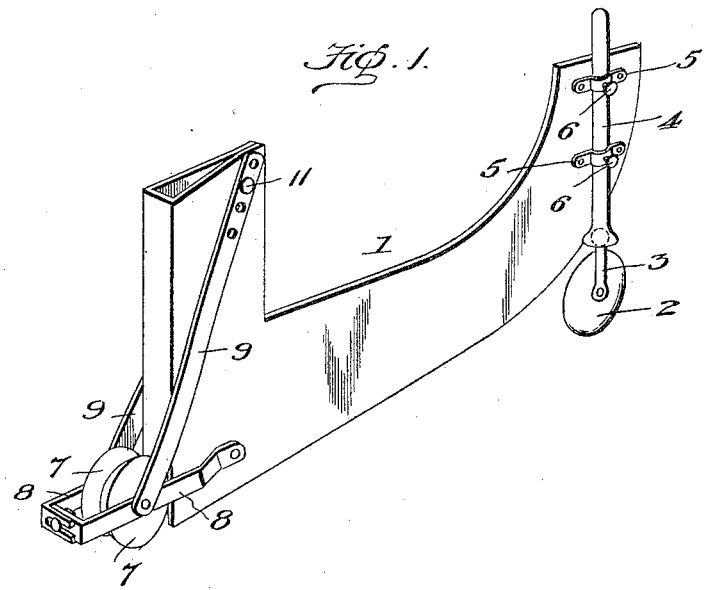
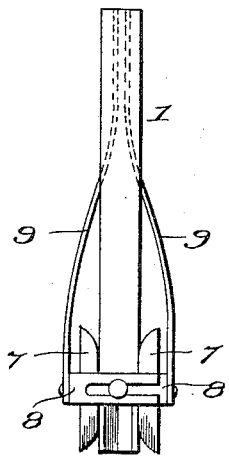

UNITED STATES PATENT OFFICE.

WILLIAM L. SPENCER, OF ADMIRE, KANSAS.

RUNNER FOR SEED-PLANTERS.

SPECIFICATION forming part of Letters Patent No. 604,800, dated May 31, 1898.

Application filed February 16, 1898. Serial No. 670,548. (No model.)

*To all whom it may concern:*

Be it known that I, WILLIAM L. SPENCER, a citizen of the United States, residing at Admire, in the county of Lyon and State of Kansas, have invented certain new and useful Improvements in Runners for Seed-Planters; and I do declare the following to be a full, clear, and exact description of the invention, such as will enable others skilled in the art to which it appertains to make and use the same.

The invention has relation to runners for seed-planters.

The object of the invention is to provide a simple and inexpensive colter which will cut roots and other obstructions in advance of the runner and cover the seed after it has been deposited.

With this object in view the invention consists in certain features of construction and combination of parts, which will be hereinafter fully described and claimed.

In the accompanying drawings, Figure 1 is a perspective view of my improved runner, and Fig. 2 is a rear view of the same.

In said drawings, 1 denotes the runner, which may be of any well-known or approved construction, having secured at its forward end a colter-wheel 2. This wheel is journaled in the short arm 3, that is swiveled in the long arm 4, which is adjustably engaged in straps 5 by set-screws 6. The colter is adapted to perform the function assigned to colters, and further description of the same is not deemed necessary.

At the heel of the runner I provide rotary covering-disks 7, the contiguous faces of which are convex. These covering-disks are journaled between two arms 8, that have their forward ends pivoted to the runner and their rear ends made laterally adjustable, in order to adjust the disks toward and away from each other, for obvious reasons. This adjustment is preferably effected by bending the rear ends of the arms at right angles to their body portions and slotting them. A bolt and a nut are used for clamping the bent ends to each other and the arms in desired adjustment.

In order to raise or lower the covering-disks, I provide the links 9, which have rows of vertical perforations, through which passes a bolt 11 for the purpose of holding the links in the desired adjustment. This adjustment enables the disks to be set for various depths in the ground, and when desired permits them to be raised free from contact with the ground.

From the foregoing description, taken in connection with the accompanying drawings, the construction and operation of the device will be readily understood without requiring an extended explanation.

Having thus described my invention, what I claim, and desire to secure by Letters Patent, is—

A runner for seed-planters, having at its forward end a vertically-adjustable swiveled colter-wheel, and at its heel a seed-coverer, consisting of two disks the contiguous faces of which are convex, arms pivoted to the runner and to the disks, and having their rear ends bent at right angles to their length and slotted, a bolt for clamping the slotted ends together in desired adjustment, and links pivoted to said arms and having vertical rows of perforations through which passes a bolt for the purpose of adjusting the covering-disks, substantially as set forth.

In testimony whereof I have hereunto set my hand in presence of two subscribing witnesses.

WILLIAM L. SPENCER.

Witnesses:
SAMUEL S. SPENCER,
J. JAY BUCK.